(12) United States Patent
Ma et al.

(10) Patent No.: US 12,519,132 B2
(45) Date of Patent: Jan. 6, 2026

(54) ELECTROLYTE ADDITIVE, LITHIUM SECONDARY BATTERY ELECTROLYTE, AND LITHIUM SECONDARY BATTERY

(71) Applicant: Huawei Technologies Co., Ltd., Shenzhen (CN)

(72) Inventors: Qiang Ma, Shenzhen (CN); Yangxing Li, Shenzhen (CN); Dejun Qin, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 1023 days.

(21) Appl. No.: 16/899,146

(22) Filed: Jun. 11, 2020

(65) Prior Publication Data

US 2020/0303775 A1   Sep. 24, 2020

Related U.S. Application Data

(63) Continuation of application No. PCT/CN2018/120237, filed on Dec. 11, 2018.

(30) Foreign Application Priority Data

Dec. 15, 2017 (CN) .......................... 201711360460.5

(51) Int. Cl.
*H01M 10/05* (2010.01)
*H01M 4/13* (2010.01)
(Continued)

(52) U.S. Cl.
CPC ....... *H01M 10/0567* (2013.01); *H01M 4/131* (2013.01); *H01M 10/0525* (2013.01); *H01M 10/0569* (2013.01); *H01M 2004/021* (2013.01)

(58) Field of Classification Search
None
See application file for complete search history.

(56) References Cited

U.S. PATENT DOCUMENTS

| 6,365,294 B1 | 4/2002 | Pintauro et al. |
| 2004/0191635 A1 | 9/2004 | Otsuki et al. |

(Continued)

FOREIGN PATENT DOCUMENTS

| CN | 1279649 C | 10/2006 | |
| CN | 102569890 | * 7/2012 | ........... Y02E 60/122 |

(Continued)

OTHER PUBLICATIONS

Ganapathiappan, S. et al., A new class of cation conductors: polyphosphazene sulfonates, 1988, Macromolecules, 21(7), pp. 2299-2301. (Year: 1988).*

(Continued)

*Primary Examiner* — Barbara L Gilliam
*Assistant Examiner* — Angela J Martin
(74) *Attorney, Agent, or Firm* — Conley Rose, P.C.

(57) ABSTRACT

A electrolyte additive includes a six-membered ring structure including three nitrogen atoms and three phosphorus (P) atoms, where each P atom includes two substituted groups, and the substituted groups are represented as $R_1$, $R_2$, $R_3$, $R_4$, $R_5$, and $R_6$, at least one substituted group of $R_1$, $R_2$, $R_3$, $R_4$, $R_5$, and $R_6$ is a substituted sulfonic group, and a remaining substituted group is any one selected from fluorine, chlorine, bromine, alkyl, haloalkyl, alkoxy, haloalkoxy, alkeny, haloalkenyl, alkenyloxy, haloalkenyloxy, aryl, haloaryl, aryloxy, haloaryloxy, a substituted phosphate ester group, a substituted imide group, and a substituted sulfonyl imide group.

20 Claims, 1 Drawing Sheet

(51) Int. Cl.
  *H01M 4/131* (2010.01)
  *H01M 10/0525* (2010.01)
  *H01M 10/0567* (2010.01)
  *H01M 10/0569* (2010.01)
  *H01M 4/02* (2006.01)

(56) References Cited

U.S. PATENT DOCUMENTS

| | | | |
|---|---|---|---|
| 2013/0089793 A1* | 4/2013 | Gering | C07F 9/65815 |
| | | | 429/336 |
| 2013/0196223 A1* | 8/2013 | Gering | H01M 4/0419 |
| | | | 427/78 |
| 2013/0295470 A1 | 11/2013 | Shatunov et al. | |
| 2014/0199600 A1 | 7/2014 | Yawata et al. | |
| 2018/0191032 A1 | 7/2018 | Liu et al. | |

FOREIGN PATENT DOCUMENTS

| | | | | |
|---|---|---|---|---|
| CN | 102569890 A | | 7/2012 | |
| CN | 102916222 A | | 2/2013 | |
| CN | 103384016 A | | 11/2013 | |
| CN | 103765662 A | | 4/2014 | |
| CN | 104466250 A | | 3/2015 | |
| CN | 105070940 | * | 11/2015 | Y02E 60/122 |
| CN | 105070940 A | | 11/2015 | |
| CN | 105098236 A | | 11/2015 | |
| CN | 105119013 A | | 12/2015 | |
| CN | 105655641 A | | 6/2016 | |
| CN | 106229549 A | | 12/2016 | |
| CN | 107293789 A | | 10/2017 | |
| CN | 107337806 | * | 11/2017 | B32B 15/04 |
| CN | 107540712 | * | 1/2018 | C07F 19/00 |
| CN | 108258297 A | | 7/2018 | |
| JP | 2012089352 A | | 5/2012 | |
| JP | 5601576 B2 | | 10/2014 | |
| WO | 2017030416 A1 | | 2/2017 | |
| WO | WO 2017030416 | * | 2/2017 | C07C 309/72 |

OTHER PUBLICATIONS

Ganapathiappan, et al., A new class of cation conductors; polyphosphazene sulfonates, 1988, Macromolecules, vol. 21 (7), pp. 2299-2301. (Year: 1988).*

Ganapathiappan, et al., Synthesis, characterizaion, and electrical response of phosphazene polyelectrolytes, 1989, J. of the American Chemical Society, vol. 111 (11), pp. 4091-4095. (Year: 1989).*

Lanoux et al., Reactions of the hydrolyzed phosphazene N3P3(OCH2CF3)5ONa, 1985, Phosphorous and Sulfur, vol. 26, pp. 139-142. (Year: 1985).*

Liu, Z., et al. "Research progress of cycle phosphazenes applied in lithium ion batteries," Energy Storage Science and Technology, 2016, vol. 5, Issue (2):, pp. 181-187.

Ganapathiappan, S., et al., "A New Class of Cation Conductors: Polyphosphazene Sulfonates," Macromolecules, vol. 21, No. 7, XP055762077, Jul. 1, 1988, pp. 2299-2301.

* cited by examiner

ELECTROLYTE ADDITIVE, LITHIUM SECONDARY BATTERY ELECTROLYTE, AND LITHIUM SECONDARY BATTERY

CROSS-REFERENCE TO RELATED APPLICATIONS

This application is a continuation of International Patent Application No. PCT/CN2018/120237 filed on Dec. 11, 2018, which claims priority to Chinese Patent Application No. 201711360460.5 filed on Dec. 15, 2017. The disclosures of the aforementioned applications are hereby incorporated by reference in their entireties.

TECHNICAL FIELD

The present application relates to the field of lithium secondary battery technologies, and in particular, to an electrolyte additive, a lithium secondary battery electrolyte, and a lithium secondary battery.

BACKGROUND

Due to advantages such as a high energy density, a high operating voltage, a long service life, a low self-discharge rate, and environment friendliness, lithium secondary batteries have been widely applied to portable electronic products (a smartphone, a digital camera, a notebook computer, and the like). With rapid development of new energy industries such as electric vehicles and large-scale energy storage grids, higher requirements are imposed on the battery energy density. Currently, developing high-specific-capacity positive and negative electrode materials and high-voltage positive electrode materials is a main technical means for increasing the energy density of the lithium secondary batteries. However, focusing on use of the high-specific-capacity materials and the high-voltage materials will inevitably result in a safety problem of a liquid lithium secondary battery. At present, an electrolyte of the lithium secondary battery is mainly a non-aqueous organic electrolyte (which is normally a carbonate electrolyte). When the battery is in an abused (such as thermal shock, overcharge, needle puncture, and external short circuit) state, because the electrolyte has a hidden danger due to volatility, flammability, and the like, thermal runaway easily occurs in the battery, resulting in a safety problem. In addition, when high-voltage positive electrode materials (>4.4 volts (V)) are used, the carbonate electrolyte is irreversibly oxidized and decomposed, resulting in deterioration of battery performance.

For the problems that the carbonate electrolyte is flammable and is not resistant to high voltage, researchers use a substance with high flame resistance and high antioxidation, for example, sulfone, nitrile, a fluorinated solvent, and an ionic liquid, as an electrolyte of a battery. This can improve the flame resistance of the electrolyte and an operating voltage of the battery. However, because the foregoing solvent is used to replace a commercial carbonate solvent, not only an electrical conductivity of the electrolyte is reduced, but also a wet ability of the solvent for an electrode and a wet ability of the solvent for a separator are reduced. Moreover, the foregoing solvent is poorly compatible with positive and negative electrode materials. Therefore, the foregoing disadvantages seriously damage electrochemical performance of the lithium secondary battery, and limit application of the lithium secondary battery. In addition, the researchers add a flame retardant additive and a high voltage resistant additive separately to a conventional electrolyte. When a plurality of functional additives is added, although the corresponding problem of the electrolyte can be resolved to some extent, the use of the excessive functional additives increases viscosity of the electrolyte and impedance of the battery. Consequently, low temperature performance and rate performance of the battery are reduced. Moreover, although widely reported flame retardants (phosphate, phosphite, halogenated carbonate, halogenated ether, and the like) can improve the flame resistance of the electrolyte, the flame retardants are poorly compatible with the positive and negative electrode materials, affecting the electrochemical performance of the battery.

In recent years, researchers have found that phosphazene flame retardants not only have high flame resistance, but also are well compatible with the positive and negative electrode materials. Therefore, it is a very practical to develop a new type of phosphazene material that has dual function characteristics of flame resistance and high-voltage resistance.

SUMMARY

In view of this, a first aspect of embodiments of the present application provides an electrolyte additive, which has dual function characteristics of flame resistance and high-voltage resistance, to resolve problems of poor cycle performance and poor safety reliability of an existing lithium secondary battery at a high voltage.

Further, the first aspect of the embodiments of the present application provides the electrolyte additive, applied to a lithium secondary battery, where a molecular structure of the electrolyte additive includes a six-membered ring structure including three nitrogen (N) atoms and three phosphorus (P) atoms, each P atom includes two substituted groups, and the substituted groups on the three P atoms are respectively represented as $R_1$, $R_2$, $R_3$, $R_4$, $R_5$, and $R_6$, at least one substituted group of $R_1$, $R_2$, $R_3$, $R_4$, $R_5$, and $R_6$ is a substituted sulfonic group, and a remaining substituted group is any one selected from fluorine, chlorine, bromine, alkyl, haloalkyl, alkoxy, haloalkoxy, alkeny, haloalkenyl, alkenyloxy, haloalkenyloxy, aryl, haloaryl, aryloxy, haloaryloxy, a substituted phosphate ester group, a substituted imide group, and a substituted sulfonyl imide group.

In the first aspect of the present application, the substituted sulfonic group is represented as —O—S(=O)$_2$—R, where R is any one selected from alkyl, haloalkyl, alkoxy, haloalkoxy, alkeny, haloalkenyl, alkenyloxy, haloalkenyloxy, aryl, haloaryl, aryloxy, haloaryloxy, a substituted phosphate ester group, a substituted imide group, and a substituted sulfonyl imide group, and an oxygen (O) atom of the substituted sulfonic group and a P atom in the six-membered ring structure form a P—O chemical bond.

In the first aspect of the present application, in the substituted sulfonic group, quantities of carbon atoms of the alkyl, the haloalkyl, the alkoxy, and the haloalkoxy range from 1 to 20, quantities of carbon atoms of the alkeny, the haloalkenyl, the alkenyloxy, and the haloalkenyloxy range from 2 to 20, quantities of carbon atoms of the aryl, the haloaryl, the aryloxy, and the haloaryloxy range from 6 to 20, and quantities of carbon atoms of substituted groups in the substituted phosphate ester group, the substituted imide group, and the substituted sulfonyl imide group range from 1 to 20.

In the first aspect of the present application, in the substituted sulfonic group, halogens in the haloalkyl, haloalkoxy, haloalkenyl, haloalkenyloxy, haloaryl, and haloaryloxy include fluorine, chlorine, bromine, and iodine, and the halogenated groups are perhalogenated groups or partially halogenated groups.

In the first aspect of the present application, in the substituted sulfonic group, R is selected from methyl (—CH3), ethyl (—CH$_2$CH$_3$), propyl (—CH$_2$CH$_2$CH$_3$), and isopropyl (—CH(CH$_3$)$_2$), butyl (—CH$_2$CH$_2$CH$_2$CH$_3$), 1-butenyl (—CH$_2$CH$_2$CH=CH$_2$), perfluorobutane (—CF$_2$CF$_2$CF$_2$CF$_3$), trifluoroethoxy (—OCH$_2$CF$_3$), methylphenyl, vinylphenyl, fluorophenyl or dimethyl phosphate ester (—OP=O(OCH$_3$)$_2$), di(trifluoroethyl) phosphate ester (—OP=O(OCH$_2$CF$_3$)$_2$), acetylimino (—NHC(=O)CH$_3$), and (trifluoromethylsulfonyl)imide (—NHS(=O)$_2$CF$_3$).

In the first aspect of the present application, any one to three groups of R$_1$, R$_2$, R$_3$, R$_4$, R$_5$, and R$_6$ are selected as the substituted sulfonic group.

In the first aspect of the present application, in R$_1$, R$_2$, R$_3$, R$_4$, R$_5$, and R$_6$, quantities of carbon atoms of the alkyl, the haloalkyl, the alkoxy, and the haloalkoxy range from 1 to 20, quantities of carbon atoms of the alkeny, the haloalkenyl, the alkenyloxy, and the haloalkenyloxy range from 2 to 20, quantities of carbon atoms of the aryl, the haloaryl, the aryloxy, and the haloaryloxy range from 6 to 20, and quantities of carbon atoms of substituted groups in the substituted phosphate ester group, the substituted imide group, and the substituted sulfonyl imide group range from 1 to 20.

In the first aspect of the present application, the six-membered ring structure is a cyclotriphosphazene structure, and a structural formula of the cyclotriphosphazene structure is shown in a formula (I):

(I)

In the electrolyte additive provided in the first aspect of the embodiments of the present application, the molecular structure of the electrolyte additive includes both a cyclotriphosphazene skeleton structure having a flame resistance function and a sulfonic group having a high-voltage film-forming function. Therefore, the electrolyte additive has dual characteristics of flame resistance and high-voltage resistance. The electrolyte additive is applied to a lithium secondary battery such that safety and high-voltage cycle performance of the lithium secondary battery can be effectively improved.

A second aspect of the embodiments of the present application provides a lithium secondary battery electrolyte, including a conductive lithium salt, non-aqueous organic solvent, and an electrolyte additive, where a molecular structure of the electrolyte additive includes a six-membered ring structure including three N atoms and three P atoms, each P atom includes two substituted groups, and the substituted groups on the three P atoms are respectively represented as R$_1$, R$_2$, R$_3$, R$_4$, R$_5$, and R$_6$, at least one substituted group of R$_1$, R$_2$, R$_3$, R$_4$, R$_5$, and R$_6$ is a substituted sulfonic group, and a remaining substituted group is any one selected from fluorine, chlorine, bromine, alkyl, haloalkyl, alkoxy, haloalkoxy, alkeny, haloalkenyl, alkenyloxy, haloalkeny-loxy, aryl, haloaryl, aryloxy, haloaryloxy, a substituted phosphate ester group, a substituted imide group, and a substituted sulfonyl imide group.

In the second aspect of the present application, the substituted sulfonic group is represented as —O—S(=O)$_2$—R, where R is any one selected from fluorine, chlorine, bromine, alkyl, haloalkyl, alkoxy, haloalkoxy, alkeny, haloalkenyl, alkenyloxy, haloalkenyloxy, aryl, haloaryl, aryloxy, haloaryloxy, a substituted phosphate ester group, a substituted imide group, and a substituted sulfonyl imide group, and an O atom of the substituted sulfonic group and a P atom in the six-membered ring structure form a P—O chemical bond.

In the second aspect of the present application, in the substituted sulfonic group, quantities of carbon atoms of the alkyl, the haloalkyl, the alkoxy, and the haloalkoxy range from 1 to 20, quantities of carbon atoms of the alkeny, the haloalkenyl, the alkenyloxy, and the haloalkenyloxy range from 2 to 20, quantities of carbon atoms of the aryl, the haloaryl, the aryloxy, and the haloaryloxy range from 6 to 20, and quantities of carbon atoms of substituted groups in the substituted phosphate ester group, the substituted imide group, and the substituted sulfonyl imide group range from 1 to 20.

In the second aspect of the present application, in the substituted sulfonic group, halogens in the haloalkyl, haloalkoxy, haloalkenyl, haloalkenyloxy, haloaryl, haloaryloxy, a haloalkyl phosphate ester group, a haloalkyl imide group, and a haloalkyl sulfonyl imide group include fluorine, chlorine, bromine, and iodine, and the halogenated groups are perhalogenated groups or partially halogenated groups.

In the second aspect of the present application, in the substituted sulfonic group, R is selected from —CH3 (methyl), —CH$_2$CH$_3$ (ethyl), —CH$_2$CH$_2$CH$_3$ (propyl), and —CH(CH$_3$)$_2$ (isopropyl), —CH$_2$CH$_2$CH$_2$CH$_3$ (butyl), —CH$_2$CH$_2$CH=CH$_2$ (1-butenyl), —CF$_2$CF$_2$CF$_2$CF$_3$ (perfluorobutane) 3, —OCH$_2$CF$_3$ (trifluoroethoxy), methylphenyl, vinylphenyl, fluorophenyl or —OP=O(OCH$_3$)$_2$ (dimethyl phosphate ester), —OP=O(OCH$_2$CF$_3$)$_2$ (di (trifluoroethyl) phosphate ester), —NHC=(O)CH$_3$ (acetylimino), and —NHS(=O)$_2$CF$_3$ ((trifluoromethylsulfonyl)imide).

In the second aspect of the present application, any one to three groups of R$_1$, R$_2$, R$_3$, R$_4$, R$_5$, and R$_6$ are selected as the substituted sulfonic group.

In the second aspect of the present application, in R$_1$, R$_2$, R$_3$, R$_4$, R$_5$, and R$_6$, quantities of carbon atoms of the alkyl, the haloalkyl, the alkoxy, and the haloalkoxy range from 1 to 20, quantities of carbon atoms of the alkeny, the haloalkenyl, the alkenyloxy, and the haloalkenyloxy range from 2 to 20, quantities of carbon atoms of the aryl, the haloaryl, the aryloxy, and the haloaryloxy range from 6 to 20, and quantities of carbon atoms of substituted groups in the substituted phosphate ester group, the substituted imide group, and the substituted sulfonyl imide group range from 1 to 20.

In the second aspect of the present application, the six-membered ring structure is a cyclotriphosphazene structure, and a structural formula of the cyclotriphosphazene structure is shown in a formula (I):

(I)

In the second aspect of the present application, a mass percentage of the electrolyte additive in the electrolyte is from 0.1% to 20%.

In the second aspect of the present application, the conductive lithium salt includes one or more of lithium perchlorate (LiClO$_4$), lithium tetrafluoroborate (LiBF$_4$), lithium hexafluorophosphate (LiPF$_6$), lithium hexafluoroarsenate (V) (LiAsF$_6$), lithium difluorophosphate (LiPF$_2$O$_2$), lithium triflate (LiCF$_3$SO$_3$), lithium 2-trifluoromethyl-4,5-dicyano-imidazolide (LiTDI), lithium bis(oxalato) borate (LiB(C$_2$O$_4$)$_2$) or (LiBOB), lithium difluoro(oxalato)borate (LiBF$_2$C$_2$O$_4$) or (LiDFOB), lithium bis(trifluoromethane-sulfonyl)imide (Li[(CF$_3$SO$_2$)$_2$N]) or (LiTFSI), lithium bis(fluorosulfonyl)imide (Li[(FSO$_2$)$_2$N]) or (LiFSI), and Li[(C$_m$F$_{2m+1}$SO$_2$)(C$_n$F$_{2n+1}$SO$_2$)N], where m and n are natural numbers.

In the second aspect of the present application, a molar concentration of the conductive lithium salt in the lithium secondary battery electrolyte is from 0.1 moles per liter (mol/L) to 2.0 mol/L.

In the second aspect of the present application, the non-aqueous organic solvent includes one or more of a carbonate solvent, an ether solvent, and a carboxylate solvent.

The lithium secondary battery electrolyte provided in the second aspect of the embodiments of the present application has dual characteristics of flame resistance and high-voltage resistance such that high-voltage cycle performance and safety of the lithium secondary battery can be effectively improved. In addition, the electrolyte is well compatible with positive and negative electrode materials of the battery.

A third aspect of the embodiments of the present application provides a lithium secondary battery, including a positive electrode, a negative electrode, a separator, and an electrolyte, where the electrolyte is the lithium secondary battery electrolyte according to the second aspect of the present application. The lithium secondary battery provided in the third aspect of the embodiments of the present application has excellent cycle performance and high safety.

BRIEF DESCRIPTION OF DRAWINGS

To describe the technical solutions in the embodiments of the present application or in the background more clearly, the following briefly describes the accompanying drawings required for describing the embodiments of the present application or the background.

DESCRIPTION OF EMBODIMENTS

The following further describes embodiments of the present application with reference to implementations of the present application.

With continuous development of high-specific-capacity and high-voltage materials, a safety problem of liquid lithium secondary battery is gradually exposed. Core components of the lithium secondary battery mainly include a positive electrode, a negative electrode, an electrolyte, and a separator. The electrolyte is a medium for transmission of lithium ions between the positive electrode and the negative electrode, and plays an important role in electrochemical performance and safety performance of the battery. The electrolyte mainly includes a conductive lithium salt, a non-aqueous organic solvent (which is usually a carbonate solvent), and an additive. At present, commercial electrolytes are mostly non-aqueous organic electrolytes. When a battery is in an abused (such as thermal shock, overcharge, and external short circuit) state, because an electrolyte of the battery has a hidden danger due to volatility, flammability, and the like, thermal runaway easily occurs in the battery, resulting in a safety problem. In addition, when high-voltage positive electrode materials (>4.4 V) are used, the carbonate electrolyte is irreversibly oxidized and decomposed, resulting in deterioration of battery performance. Therefore, to develop a high-energy and high-safety lithium secondary battery, it is imperative to develop flame-resistant and high-voltage-resistance electrolyte. In view of this, embodiments of the present application provide an electrolyte additive that has dual characteristics of flame resistance and high-voltage resistance. A small amount of the electrolyte additive may be added to an electrolyte, to significantly improve electrolyte performance and battery performance. The electrolyte additive has a broad application prospect.

Further, the embodiments of the present application provides an electrolyte additive, applied to a lithium secondary battery, where a molecular structure of the electrolyte additive includes a six-membered ring structure including three N atoms and three P atoms, each P atom includes two substituted groups, and the substituted groups on the three P atoms are respectively represented as R$_1$, R$_2$, R$_3$, R$_4$, R$_5$, and R$_6$, at least one substituted group of R$_1$, R$_2$, R$_3$, R$_4$, R$_5$, and R$_6$ is a substituted sulfonic group, and a remaining substituted group is any one selected from fluorine, chlorine, bromine, alkyl, haloalkyl, alkoxy, haloalkoxy, alkeny, haloalkenyl, alkenyloxy, haloalkenyloxy, aryl, haloaryl, aryloxy, haloaryloxy, a substituted phosphate ester group, a substituted imide group, and a substituted sulfonyl imide group.

In the electrolyte additive provided in the embodiments of the present application, the six-membered ring structure that has high flame resistance performance and that contains both N and P is used as a skeleton, and the sulfonic group with high-voltage film-forming performance is introduced to the six-membered ring structure through chemical bonding. Therefore, the electrolyte additive has dual characteristics of flame resistance and high-voltage resistance. Further, because the six-membered ring structure includes elements such as P and N, in a case of battery thermal runaway, P-series free radicals are generated through decomposition of the six-membered ring structure, to capture H or OH free radicals generated through thermal decomposition of the electrolyte, and a chain reaction is interrupted. In addition, gases such as NH$_3$ are generated through decomposition of the six-membered ring structure, and dilutes free radicals and O that are generated through thermal decomposition of the electrolyte, to reduce a concentration of a flammable substance. Therefore, flammability of the electrolyte can be suppressed, and safety of the battery can be improved. When the battery works at a high voltage (>4.4 V), sulfonic groups can form a dense and high-li-ion-conductive coating layer (where components of the coating layer are mainly lithium sulfite ($Li_2SO_3$), lithium sulfate ($Li_2SO_4$), $LiSO_3R$, and the like) on a surface of a positive electrode material. This can effectively suppress oxidation decomposition caused by direct contact between the electrolyte and the positive electrode material at the high voltage, and improve high-voltage cycle performance of the battery.

In an implementation of the present application, the substituted sulfonic group is represented as —O—S(=O) 2-R, where R is any one selected from alkyl, haloalkyl, alkoxy, haloalkoxy, alkeny, haloalkenyl, alkenyloxy, haloalkenyloxy, aryl, haloaryl, aryloxy, haloaryloxy, a substituted phosphate ester group, a substituted imide group, and a substituted sulfonyl imide group, and an O atom of the substituted sulfonic group and a P atom in the six-membered ring structure form a P—O chemical bond.

In an implementation of the present application, in the substituted sulfonic group, quantities of carbon atoms of the alkyl, the haloalkyl, the alkoxy, and the haloalkoxy range from 1 to 20, and the quantities of carbon atoms further range from 1 to 8, quantities of carbon atoms of the alkeny, the haloalkenyl, the alkenyloxy, and the haloalkenyloxy range from 2 to 20, and the quantities of carbon atoms further range from 2 to 8, quantities of carbon atoms of the aryl, the haloaryl, the aryloxy, and the haloaryloxy range from 6 to 20, and the quantities of carbon atoms further range from 7 to 10, and quantities of carbon atoms of substituted groups in the substituted phosphate ester group, the substituted imide group, and the substituted sulfonyl imide group range from 1 to 20, and the quantities of carbon atoms further range from 1 to 8 or from 6 to 14.

In an implementation of the present application, in the substituted sulfonic group, a halogen or a group including a halogen is conducive to enhancing flame resistance performance of the electrolyte additive.

In an implementation of the present application, in the substituted sulfonic group, halogens in the haloalkyl, haloalkoxy, haloalkenyl, haloalkenyloxy, haloaryl, and haloaryloxy include fluorine, chlorine, bromine, and iodine, and the halogenated groups may be perhalogenated groups or partially halogenated groups.

In an implementation of the present application, in the substituted sulfonic group, the alkyl, haloalkyl, alkoxy, haloalkoxy, alkeny, haloalkenyl, alkenyloxy, and haloalkenyloxy may be straight-chained or branched-chained.

In a specific implementation of the present application, in the substituted sulfonic group, R is selected from —CH3 (methyl), —$CH_2CH_3$ (ethyl), —$CH_2CH_2CH_3$ (propyl), and —$CH(CH_3)_2$ (isopropyl), —$CH_2CH_2CH_2CH_3$ (butyl), —$CH_2CH_2CH=CH_2$ (1-butenyl), —$CF_2CF_2CF_2CF_3$ (perfluorobutane) 3, —$OCH_2CF_3$ (trifluoroethoxy), methylphenyl, vinylphenyl, fluorophenyl or —OP=O($OCH_3)_2$ (dimethyl phosphate ester), —OP=O($OCH_2CF_3)_2$ (di(trifluoroethyl) phosphate ester), —NH(C=O)$CH_3$ (acetylimino), and —NHS(=O)$_2CF_3$ ((trifluoromethylsulfonyl)imide).

In an implementation of the present application, the substituted imide group may be represented as —NH—C(=O)—X, where a substituted group X may be any one selected from alkyl, haloalkyl, alkoxy, haloalkoxy, alkeny, haloalkenyl, alkenyloxy, haloalkenyloxy, aryl, haloaryl, aryloxy, and haloaryloxy, and the substituted sulfonyl imide group may be expressed as —NH—S(=O)$_2$—Y, where a substituted group Y may be represented as —NH—C(=O)—X, where a substituted group X may be any one selected from alkyl, haloalkyl, alkoxy, haloalkoxy, alkeny, haloalkenyl, alkenyloxy, haloalkenyloxy, aryl, haloaryl, aryloxy, and haloaryloxy. For substituted groups that contain halogens and that are in the substituted imide group and the substituted sulfonyl imide group, the halogens may be fluorine, chlorine, bromine, or iodine, and the halogenated groups may be perhalogenated groups or partially halogenated groups. The alkyl, haloalkyl, alkoxy, haloalkoxy, alkeny, haloalkenyl, alkenyloxy, and haloalkenyloxy may be straight-chained or branched-chained.

In an implementation of the present application, $R_1$, $R_2$, $R_3$, $R_4$, $R_5$, and $R_6$ may be same groups or different groups.

In an implementation of the present application, any one to three groups of $R_1$, $R_2$, $R_3$, $R_4$, $R_5$, and $R_6$ are selected as the substituted sulfonic group. Further, any one, two, or three groups may be selected as the substituted sulfonic group. Due to a steric hindrance problem, generally, when there are two or three substituted sulfonic groups in $R_1$, $R_2$, $R_3$, $R_4$, $R_5$, and $R_6$, the sulfonic substitutes are separately located on different P atoms. The substituted sulfonic groups may be the same or different. Certainly, in another implementation, alternatively, any four or five groups of $R_1$, $R_2$, $R_3$, $R_4$, $R_5$, and $R_6$ may be selected as the substituted sulfonic groups, or all the six groups are the substituted sulfonic groups.

In an implementation of the present application, in $R_1$, $R_2$, $R_3$, $R_4$, $R_5$, and $R_6$, quantities of carbon atoms of the alkyl, the haloalkyl, the alkoxy, and the haloalkoxy range from 1 to 20, and the quantities of carbon atoms further range from 1 to 8, quantities of carbon atoms of the alkeny, the haloalkenyl, the alkenyloxy, and the haloalkenyloxy range from 2 to 20, and the quantities of carbon atoms further range from 2 to 8, quantities of carbon atoms of the aryl, the haloaryl, the aryloxy, and the haloaryloxy range from 6 to 20, and the quantities of carbon atoms further range from 7 to 10, and quantities of carbon atoms of substituted groups in the substituted phosphate ester group, the substituted imide group, and the substituted sulfonyl imide group range from 1 to 20, and the quantities of carbon atoms further range from 1 to 8 or from 6 to 14.

In an implementation of the present application, in $R_1$, $R_2$, $R_3$, $R_4$, $R_5$, and $R_6$, a halogen or a group including a halogen is conducive to enhancing flame resistance performance of the electrolyte additive. Halogens in the haloalkyl, haloalkoxy, haloalkenyl, haloalkenyloxy, haloaryl, and haloaryloxy include fluorine, chlorine, bromine, and iodine, and the halogenated groups may be perhalogenated groups or partially halogenated groups. The alkyl, haloalkyl, alkoxy, haloalkoxy, alkeny, haloalkenyl, alkenyloxy, and haloalkenyloxy may be straight-chained or branched-chained.

In an implementation of the present application, any three to five groups of $R_1$, $R_2$, $R_3$, $R_4$, $R_5$, and $R_6$ are fluorine, chlorine, bromine, haloalkyl, haloalkoxy, haloalkenyl, haloalkenyloxy, haloaryl, haloaryloxy, a phosphate ester group containing a substituted halogen group, an imide group containing a substituted halogen group, and a sulfonyl imide group containing a substituted halogen group.

In an implementation of the present application, the six-membered ring structure may be, but is not limited to, a cyclotriphosphazene structure, or may be another specific structure that can be implemented in chemical composition. The cyclotriphosphazene structure is shown in a formula (I):

(I)

Further, in a specific implementation of the present application, molecular structural formulas of the electrolyte additive may be shown in formulas (A) to (F):

(A)

(B)

(C)

(D)

(E) and (F)

In the electrolyte additive provided in the embodiments of the present application, the molecular structure of the electrolyte additive includes both a sulfonic group having a high-voltage film-forming function and a six-membered ring skeleton structure that has a flame resistance function and that contains N and P. Therefore, the electrolyte additive has dual characteristics of flame resistance and high-voltage resistance. The electrolyte additive is applied to a lithium secondary battery such that high-voltage cycle performance of the lithium secondary battery can be effectively improved.

Using an example in which the six-membered ring structure is a cyclotriphosphazene structure, the electrolyte additive provided in the embodiments of the present application may be prepared by performing the following synthesis steps.

Separately add sodium metal, a cyclotriphosphazene compound, and a solvent to a three-necked flask, perform stirring at −20° C. to −30° C. until the sodium metal is reacted completely, then slowly add a sulfonyl halide compound to the three-necked flask, perform stirring at 25° C. to 60° C. for 6 hours to 48 hours until the sulfonyl halide compound is reacted, perform filtering, reduce a pressure, and perform drying, to obtain the electrolyte additive shown in the formula (I).

The cyclotriphosphazene compound is determined based on a molecular structure of a specific to-be-prepared electrolyte additive, and includes but is not limited to a pentafluoro (hydroxyl) cyclotriphosphazene, 1,3,5-trifluoro (2,4,6-trihydroxyl) cyclotriphosphazene, and the like. The solvent includes but is not limited to one or more of ethane, cyclohexane, dichloromethane, trichloromethane, ethyl ether, petroleum ether, benzene, toluene, chlorobenzene, fluorobenzene, acetone, acetonitrile, methanol, tetrahydrofuran, nitromethane, dimethylsulfone, N,N-dimethylformamide, ethyl acetate, and butyl acetate.

The sulfonyl halide compound includes a sulfonyl chloride compound and a sulfonyl fluoride compound. The sulfonyl chloride compound may be represented as $RSO_2Cl$, and the sulfonyl fluoride compound may be represented as $RSO_2F$. R may be any one selected from alkyl, haloalkyl, alkoxy, haloalkoxy, alkeny, haloalkenyl, alkenyloxy, haloalkenyloxy, aryl, haloaryl, aryloxy, haloaryloxy, a substituted phosphate ester group, a substituted imide group, and a substituted sulfonyl imide group. Further, the sulfonyl halide compound includes, but is not limited to, methylsulfonyl chloride, butenyl sulfonyl chloride, trifluoroethoxyl sulfonyl fluoride, perfluorobutyl sulfonyl fluoride, and toluene sulfonyl chloride.

Further, the pentafluoro (perfluorobutylsulfonyl) cyclotriphosphazene shown in the formula (F) may be prepared by performing the following steps.

Separately add 1.0 mol sodium metal, 1.0 mol pentafluoro (hydroxyl) cyclotriphosphazene nitrile, and 200 milliliters (mL) acetonitrile to a 500 mL three-necked flask, perform stirring at 25 degree Celsius (° C.) until the sodium metal is reacted completely, and then slowly drop 1.0 mol mixture of perfluorobutyl sulfonyl fluoride and acetonitrile using a constant pressure dropping funnel. After all the mixture is dropped, the mixture is reacted for 24 hours at 50° C. Perform filtering, reduce a pressure, and perform drying, to obtain the pentafluoro (perfluorobutylsulfonyl) cyclotriphosphazene. Other electrolyte additives (for example, the compounds A to E) in the embodiments of the present application may be prepared using a similar method, and details are not described herein again.

The embodiments of the present application further provide a lithium secondary battery electrolyte, including a conductive lithium salt, non-aqueous organic solvent, and an electrolyte additive, where a molecular structure of the electrolyte additive includes a six-membered ring structure including three N atoms and three P atoms, each P atom includes two substituted groups, and the substituted groups on the three P atoms are respectively represented as $R_1$, $R_2$, $R_3$, $R_4$, $R_5$, and $R_6$, at least one substituted group of $R_1$, $R_2$, $R_3$, $R_4$, $R_5$, and $R_6$ is a substituted sulfonic group, and a remaining substituted group is any one selected from fluorine, chlorine, bromine, alkyl, haloalkyl, alkoxy, haloalkoxy, alkeny, haloalkenyl, alkenyloxy, haloalkenyloxy, aryl, haloaryl, aryloxy, haloaryloxy, a substituted phosphate ester group, a substituted imide group, and a substituted sulfonyl imide group.

In an implementation of the present application, the substituted sulfonic group is represented as —O—S(=O)2-R, where R is any one selected from alkyl, haloalkyl, alkoxy, haloalkoxy, alkeny, haloalkenyl, alkenyloxy, haloalkenyloxy, aryl, haloaryl, aryloxy, haloaryloxy, a substituted phosphate ester group, a substituted imide group, and a substituted sulfonyl imide group, and an O atom of the substituted sulfonic group and a P atom in the six-membered ring structure form a P—O chemical bond.

In an implementation of the present application, in the substituted sulfonic group, quantities of carbon atoms of the alkyl, the haloalkyl, the alkoxy, and the haloalkoxy range from 1 to 20, and the quantities of carbon atoms further range from 1 to 8, quantities of carbon atoms of the alkeny, the haloalkenyl, the alkenyloxy, and the haloalkenyloxy range from 2 to 20, and the quantities of carbon atoms further range from 2 to 8, quantities of carbon atoms of the aryl, the haloaryl, the aryloxy, and the haloaryloxy range from 6 to 20, and the quantities of carbon atoms further range from 7 to 10, and quantities of carbon atoms of substituted groups in the substituted phosphate ester group, the substituted imide group, and the substituted sulfonyl imide group range from 1 to 20, and the quantities of carbon atoms further range from 1 to 8 or from 6 to 14.

In an implementation of the present application, in the substituted sulfonic group, halogens in the haloalkyl, haloalkoxy, haloalkenyl, haloalkenyloxy, haloaryl, and haloaryloxy include fluorine, chlorine, bromine, and iodine, and the halogenated groups are perhalogenated groups or partially halogenated groups.

In an implementation of the present application, in the substituted sulfonic group, R is selected from —CH3 (methyl), —CH$_2$CH$_3$ (ethyl), —CH$_2$CH$_2$CH$_3$ (propyl), and —CH(CH$_3$)$_2$ (isopropyl), —CH$_2$CH$_2$CH$_2$CH$_3$ (butyl), —CH$_2$CH$_2$CH=CH$_2$ (1-butenyl), —CF$_2$CF$_2$CF$_2$CF$_3$ (perfluorobutane) 3, —OCH$_2$CF$_3$ (trifluoroethoxy), methylphenyl, vinylphenyl, fluorophenyl or —OP=O(OCH$_3$)$_2$ (dimethyl phosphate ester), —OP=O(OCH$_2$CF$_3$)$_2$ (di (trifluoroethyl) phosphate ester), —NH(C=O)CH$_3$ (acetylimino), and —NHS(=O)$_2$CF$_3$ ((trifluoromethylsulfonyl)imide).

In an implementation of the present application, any one to three groups of $R_1$, $R_2$, $R_3$, $R_4$, $R_5$, and $R_6$ are selected as the substituted sulfonic group.

In an implementation of the present application, in $R_1$, $R_2$, $R_3$, $R_4$, $R_5$, and $R_6$, quantities of carbon atoms of the alkyl, the haloalkyl, the alkoxy, and the haloalkoxy range from 1 to 20, and the quantities of carbon atoms further range from 1 to 8, quantities of carbon atoms of the alkeny, the haloalkenyl, the alkenyloxy, and the haloalkenyloxy range from 2 to 20, and the quantities of carbon atoms further range from 2 to 8, quantities of carbon atoms of the aryl, the haloaryl, the aryloxy, and the haloaryloxy range from 6 to 20, and the quantities of carbon atoms further range from 7 to 10, and quantities of carbon atoms of substituted groups in the substituted phosphate ester group, the substituted imide group, and the substituted sulfonyl imide group range from 1 to 20, and the quantities of carbon atoms further range from 1 to 8 or from 6 to 14.

In an implementation of the present application, the substituted imide group may be represented as —NH—C(=O)—X, where a substituted group X may be any one selected from alkyl, haloalkyl, alkoxy, haloalkoxy, alkeny, haloalkenyl, alkenyloxy, haloalkenyloxy, aryl, haloaryl, aryloxy, and haloaryloxy, and the substituted sulfonyl imide group may be expressed as —NH—S(=O)$_2$—Y, where a substituted group Y may be represented as —NH—C(=O)—X, where a substituted group X may be any one selected from alkyl, haloalkyl, alkoxy, haloalkoxy, alkeny, haloalkenyl, alkenyloxy, haloalkenyloxy, aryl, haloaryl, aryloxy, and haloaryloxy. For substituted groups that contain halogens and that are in the substituted imide group and the substituted sulfonyl imide group, the halogens may be fluorine, chlorine, bromine, or iodine, and the halogenated groups may be perhalogenated groups or partially halogenated groups. The alkyl, haloalkyl, alkoxy, haloalkoxy, alkeny, haloalkenyl, alkenyloxy, and haloalkenyloxy may be straight-chained or branched-chained.

In an implementation of the present application, a mass percentage of the electrolyte additive in the electrolyte is from 0.1% to 20%, and may further be from 2% to 10%, from 5% to 15%, or from 8% to 12%. Addition of the electrolyte additive with a proper mass percentage not only can give full play to flame resistance and high voltage resistance performance, but also can ensure that viscosity of the electrolyte is not excessively high and does not affect battery performance.

In an implementation of the present application, the conductive lithium salt includes one or more of LiClO$_4$, LiBF$_4$, LiPF$_6$, LiAsF$_6$, LiPF$_2$O$_2$, LiCF$_3$SO$_3$, LiTDI, LiB(C$_2$O$_4$)$_2$ (LiBOB), LiBF$_2$C$_2$O$_4$ (LiDFOB), Li[(CF$_3$SO$_2$)$_2$N] (LiTFSI), Li[(FSO$_2$)$_2$N] (LiFSI), and Li[(C$_m$F$_{2m+1}$SO$_2$)(C$_n$F$_{2n+1}$SO$_2$)N], where m and n are natural numbers.

In an implementation of the present application, a molar concentration of the conductive lithium salt in the lithium secondary battery electrolyte is from 0.1 mol/L to 2.0 mol/L. The molar concentration may further be 0.7 mol/L to 1.5 mol/L.

In an implementation of the present application, the non-aqueous organic solvent includes one or more of a carbonate solvent, an ether solvent, and a carboxylate solvent. The non-aqueous organic solvent may be obtained after the foregoing solvents are mixed in any ratio. The carbonate solvent includes a cyclic carbonate or a chain carbonate. The cyclic carbonate may be one or more of ethylene carbonate (EC), propylene carbonate (PC), γ-butyrolactone (GBL), or butylene carbonate (BC). The chain carbonate may be one or more of dimethyl carbonate (DMC), ethyl methyl carbonate (EMC), diethylene carbonate (DEC), and dipropyl carbonate (DPC). The ether solvent includes a cyclic ether or a chain ether. The cyclic ether may be one or more of 1,3-dioxolane (DOL), 1,4-dioxane (DX), a crown ether, or tetrahydrofuran (THF), 2-methyl tetrahydrofuran (2-$CH_3$-THF), and 2-trifluoromethyl tetrahydrofuran (2-$CF_3$-THF). The chain ether may be one or more of dimethoxymethane (DMM), 1,2-dimethoxyethane (DME), and diethylene glycol dimethyl ether (TEGDME). The carboxylate solvent may be one or more of methyl acetate (MA), ethyl acetate (EA), propyl acetate (EP), butyl acetate, propyl acetate (PP), and butyl propionate.

The lithium secondary battery electrolyte provided in the embodiments of the present application has dual characteristics of flame resistance and high-voltage resistance such that high-voltage cycle performance and safety of the lithium secondary battery can be effectively improved. In addition, the electrolyte is well compatible with positive and negative electrode materials of the battery, and does not deteriorate other performance (such as low temperature performance and rate performance) of the battery. Therefore, the electrolyte has a broad application prospect.

Correspondingly, the embodiments of the present application further provide a lithium secondary battery, including a positive electrode, a negative electrode, a separator, and an electrolyte, where the electrolyte is the lithium secondary battery electrolyte according to the embodiments of the present application. In the lithium secondary battery provided in the embodiments of the present application, because a high-voltage electrolyte additive having both characteristics of flame resistance and high-voltage resistance is added to an electrolyte of the lithium secondary battery, the lithium secondary battery has excellent high-voltage cycle performance and high safety.

The following uses a plurality of embodiments to further describe the embodiments of the present application.

Embodiment 1

A lithium secondary battery electrolyte includes a conductive lithium salt ($LiPF_6$), a non-aqueous organic solvent obtained after EC, EMC, DEC, and PC are mixed according to a weight ratio of 35:25:25:15, and an electrolyte additive whose molecular structural formula is shown in the formula (A). A concentration of the conductive lithium salt ($LiPF_6$) is 1.0 mol/L, a mass percentage of the electrolyte additive A is 2%, and (A)

Preparation of the lithium secondary battery electrolyte in this embodiment is as follows.

In a glove box filled with argon gas, the EC, EMC, DEC, and PC are mixed to form the non-aqueous organic solvent, the electrolyte additive A is added to the non-aqueous organic solvent, and then the conductive lithium salt ($LiPF_6$) that is fully dried is dissolved in the solvent, and is stirred and mixed evenly, to obtain the lithium secondary battery electrolyte in Embodiment 1 of the present application.

Preparation of a lithium secondary battery is as follows.

Polyvinylidene fluoride (PVDF) with a mass percentage of 3%, a conductive agent super P with a mass percentage of 2%, and lithium cobalt acid ($LiCoO_2$) with a mass percentage of 95% are obtained through weighing and added to N-methylpyrrolidone (NMP) in sequence, and are fully stirred and mixed evenly to obtain slurry. The slurry is coated on an aluminum foil current collector, and is dried, cold pressed, and cut to obtain positive electrode plates.

Carboxymethyl cellulose (CMC) with a mass percentage of 2%, styrene-butadiene rubber (SBR) with a mass percentage of 3%, acetylene black with a mass percentage of 1%, and graphite with a mass percentage of 94% are obtained through weighing and added to deionized water in sequence, and are fully stirred and mixed evenly to obtain slurry. The slurry is coated on a copper foil current collector, and is dried, cold pressed, and cut to obtain negative electrode plates.

The prepared positive electrode plate, the prepared negative electrode plate, and a commercial PP/PE/PP three-layer separator are used to produce a battery cell. The cell is packaged using a polymer, and the prepared electrolyte is injected such that a 3.7 ampere hours (Ah) soft pack lithium secondary battery is produced using a process such as formation.

Embodiment 2

A difference between this embodiment and Embodiment 1 lies only in that a mass percentage of the electrolyte additive A is 5%.

Embodiment 3

A difference between this embodiment and Embodiment 1 lies only in that a mass percentage of the electrolyte additive A is 10%.

Embodiment 4

A lithium secondary battery electrolyte includes a conductive lithium salt ($LiBF_4$), a non-aqueous organic solvent obtained after EC, EMC, DEC, and PC are mixed according to a weight ratio of 35:25:25:15, and an electrolyte additive whose molecular structural formula is shown in the formula (B). A concentration of the conductive lithium salt ($LiBF_4$) is 1.0 mol/L, a mass percentage of the electrolyte additive B is 2%, and (B)

Embodiment 5

A difference between this embodiment and Embodiment 4 lies only in that a mass percentage of the electrolyte additive B is 5%.

Embodiment 6

A difference between this embodiment and Embodiment 4 lies only in that a mass percentage of the electrolyte additive B is 10%.

Embodiment 7

A lithium secondary battery electrolyte includes a conductive lithium salt (LiTFSI), a non-aqueous organic solvent obtained after EC, EMC, DEC, and PC are mixed according to a weight ratio of 35:25:25:15, and an electrolyte additive whose molecular structural formula is shown in the formula (C). A concentration of the conductive lithium salt (LiTFSI) is 1.0 mol/L, a mass percentage of the electrolyte additive C is 2%, and (C)

Embodiment 8

A difference between this embodiment and Embodiment 7 lies only in that a mass percentage of the electrolyte additive C is 5%.

Embodiment 9

A difference between this embodiment and Embodiment 7 lies only in that a mass percentage of the electrolyte additive C is 10%.

Embodiment 10

A lithium secondary battery electrolyte includes a conductive lithium salt (LiBOB), a non-aqueous organic solvent obtained after EC, EMC, DEC, and PC are mixed according to a weight ratio of 35:25:25:15, and an electrolyte additive whose molecular structural formula is shown in the formula (D). A concentration of the conductive lithium salt (LiBOB) is 1.0 mol/L, a mass percentage of the electrolyte additive D is 2%, and (D)

Embodiment 11

A difference between this embodiment and Embodiment 10 lies only in that a mass percentage of the electrolyte additive D is 5%.

Embodiment 12

A difference between this embodiment and Embodiment 10 lies only in that a mass percentage of the electrolyte additive D is 10%.

Embodiment 13

A lithium secondary battery electrolyte includes conductive lithium salts (LiPF$_6$+LiFSI), a non-aqueous organic solvent obtained after EC, EMC, DEC, and PC are mixed according to a weight ratio of 35:25:25:15, and an electrolyte additive whose molecular structural formula is shown in the formula (E). Concentrations of the conductive lithium salts LiPF$_6$ and LiFSI each are 0.5 mol/L, a mass percentage of the electrolyte additive E is 2%, and (E)

Embodiment 14

A difference between this embodiment and Embodiment 13 lies only in that a mass percentage of the electrolyte additive E is 5%.

Embodiment 15

A difference between this embodiment and Embodiment 13 lies only in that a mass percentage of the electrolyte additive E is 10%.

Embodiment 16

A lithium secondary battery electrolyte includes conductive lithium salts (LiFSI+LiDFOB), a non-aqueous organic solvent obtained after EC, EMC, DEC, and PC are mixed according to a weight ratio of 35:25:25:15, and an electrolyte additive, pentafluoro (perfluorobutylsulfonyl) cyclotriphosphazene, whose molecular structural formula is shown in the formula (F). Concentrations of the conductive lithium salts LiFSI and LiDFOB each are 0.5 mol/L, a mass percentage of the electrolyte additive F is 2%, and (F)

Embodiment 17

A difference between this embodiment and Embodiment 16 lies only in that a mass percentage of the electrolyte additive E is 5%.

Embodiment 18

A difference between this embodiment and Embodiment 16 lies only in that a mass percentage of the electrolyte additive E is 10%.

Comparative Example 1

In a glove box filled with argon gas, EC, EMC, DEC, and PC are mixed according to a weight ratio of 35:25:25:15, to form a non-aqueous organic solvent, and then a conductive lithium salt ($LiPF_6$) that is fully dried is dissolved in the non-aqueous organic solvent, and is stirred and mixed evenly, to obtain a lithium secondary battery electrolyte in the comparative example 1 of the present application. A concentration of the lithium salt is 1.0 mol/L.

Comparative Example 2

The lithium conductive salt $LiPF_6$ in the comparative example 1 is replaced by $LiBF_4$.

Comparative Example 3

The lithium conductive salt $LiPF_6$ in the comparative example 1 is replaced by LiFSI.

Comparative Example 4

The lithium conductive salt $LiPF_6$ in the comparative example 1 is replaced by LiBOB.

Comparative Example 5

The lithium conductive salt $LiPF_6$ in the comparative example 1 is replaced by $LiPF_6$+LiFSI.

Comparative Example 6

The lithium conductive salt $LiPF_6$ in the comparative example 1 is replaced by LiFSI+LiDFOB.

Preparation of a lithium secondary battery is as follows.

According to the preparation method in Embodiment 1 of the present application, the electrolytes in Embodiments 2 to 18 and the comparative examples 1 to 6 are separately assembled into corresponding 3.7 Ah soft pack lithium secondary batteries.

Effect Embodiment

To provide strong support for beneficial effects that are brought by the technical solutions in the embodiments of the present application, the following tests are specially provided (1) Self-Extinguishing Performance Tests of Electrolytes is as Follows.

1.0 gram (g) samples taken from the electrolytes in Embodiments 1 to 18 and the comparative examples 1 to 6 are separately placed in a 5.0 mL crucible, and are ignited to test self-extinguishing time of the samples. A sample is quickly ignited using an ignition device, and time from a time point at which the ignition device is removed to a time point at which the flame spontaneously extinguishes, namely, the self-extinguishing time (SET), is recorded. SET tests are performed on each type of electrolyte sample for five times, and an average value is calculated. Flame resistance performance of different electrolytes is compared using the self-extinguishing time of the electrolytes per unit mass. Test results are shown in Table 1.

(2) Cycle Performance Tests of Lithium Secondary Batteries

Figure 1:
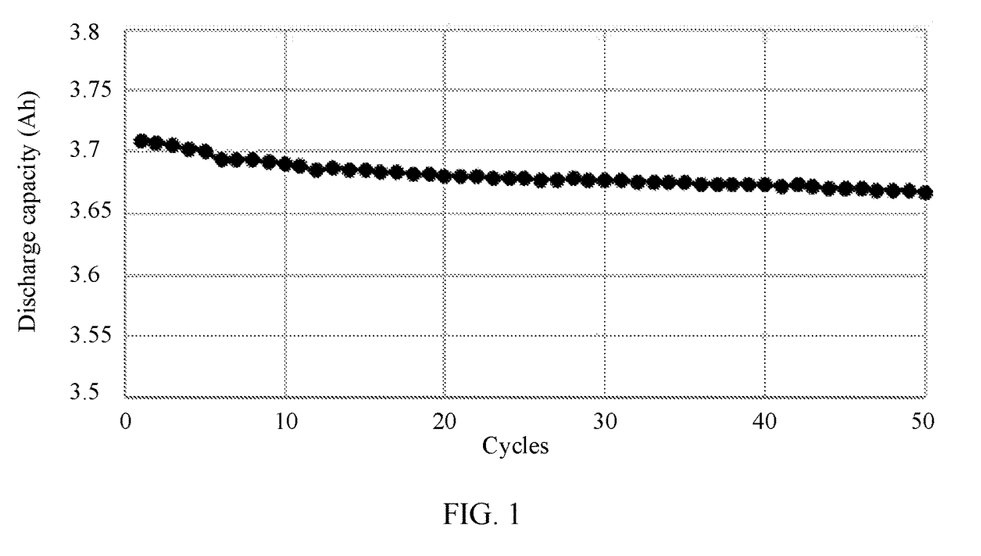
FIG. 1 is a cycle curve that is in the first 50 cycles and that is of a lithium secondary battery prepared according to Embodiment 3 of the present application.
Figure 2:
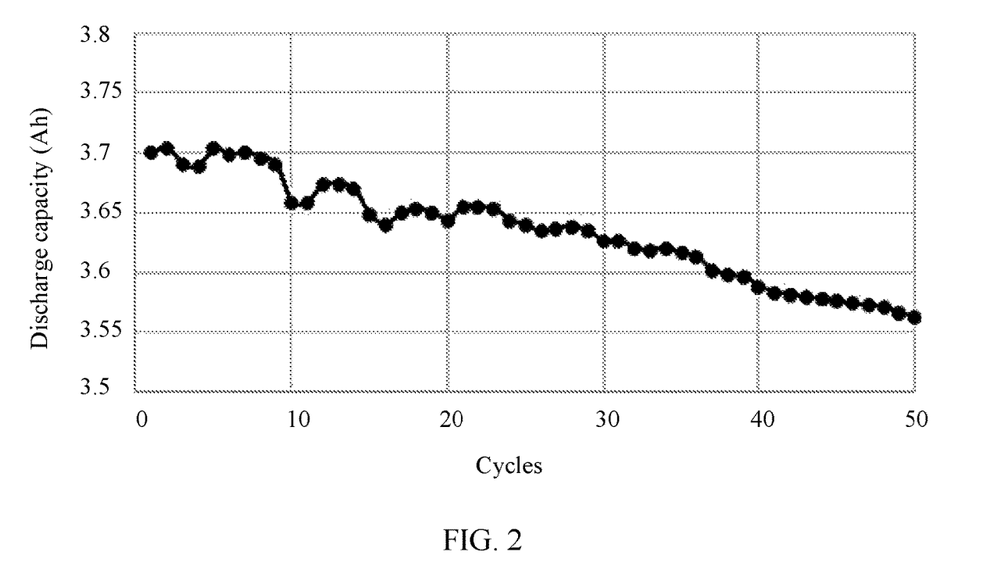
FIG. 2 is a cycle curve that is in the first 50 cycles and that is of a lithium secondary battery prepared according to a comparative example 1.

Charge and discharge cycle tests are performed on the lithium secondary batteries obtained through assembling in Embodiment 1 to Embodiment 18 and the comparative examples 1 to 6 at a charge and discharge rate of 0.7/0.7 C, a voltage range of the graphite/$LiCoO_2$ battery is from 3.0 V to 4.5 V, and a capacity retention rate after 500 cycles is recorded. Test results are shown in Table 1. In addition, FIG. 1 is a cycle curve that is in the first 50 cycles and that is of the lithium secondary battery prepared according to Embodiment 3 of the present application, and FIG. 2 is a cycle curve that is in the first 50 cycles and that is of the lithium secondary battery prepared according to the comparative example 1.

TABLE 1

Test results of self-extinguishing performance of the electrolytes and cycle performance of the batteries in Embodiment 1 to Embodiment 18 and the comparative examples 1 to 6

| Embodiment | Conductive lithium salt | Electrolyte additive (content %) | SET in seconds (s) | Capacity retention rate after 500 cycles |
|---|---|---|---|---|
| Embodiment 1 | $LiPF_6$ | A (2%) | 4 | 83% |
| Embodiment 2 | $LiPF_6$ | A (5%) | 0 | 85% |
| Embodiment 3 | $LiPF_6$ | A (10%) | 0 | 88% |
| Embodiment 4 | $LiBF_4$ | B (2%) | 6 | 80% |
| Embodiment 5 | $LiBF_4$ | B (5%) | 0 | 83% |
| Embodiment 6 | $LiBF_4$ | B (10%) | 0 | 85% |
| Embodiment 7 | LiTFSI | C (2%) | 7 | 75% |
| Embodiment 8 | LiTFSI | C (5%) | 0 | 78% |
| Embodiment 9 | LiTFSI | C (10%) | 0 | 80% |
| Embodiment 10 | LiBOB | D (2%) | 5 | 81% |
| Embodiment 11 | LiBOB | D (5%) | 0 | 82% |
| Embodiment 12 | LiBOB | D (10%) | 0 | 84% |
| Embodiment 13 | $LiPF_6$ + LiFSI | E (2%) | 3 | 84% |
| Embodiment 14 | $LiPF_6$ + LiFSI | E (5%) | 0 | 87% |
| Embodiment 15 | $LiPF_6$ + LiFSI | E (10%) | 0 | 89% |
| Embodiment 16 | LiFSI + LiDFOB | F (2%) | 4 | 83% |
| Embodiment 17 | LiFSI + LiDFOB | F (5%) | 0 | 86% |
| Embodiment 18 | LiFSI + LiDFOB | F (10%) | 0 | 88% |
| Comparative example 1 | $LiPF_6$ | 0 | 22 | 73% |
| Comparative example 2 | $LiBF_4$ | 0 | 25 | 71% |
| Comparative example 3 | LiTFSI | 0 | 23 | 64% |
| Comparative example 4 | LiBOB | 0 | 21 | 72% |
| Comparative example 5 | $LiPF_6$ + LiFSI | 0 | 24 | 75% |
| Comparative example 6 | LiFSI + LiDFOB | 0 | 23 | 74% |

It can be learned from the test results in Table 1 that, compared with the electrolytes in the comparative examples 1 to 6, the electrolytes in Embodiments 1 to 18 of the present application have higher flame resistance, and especially, when contents of the electrolyte additives are greater than or equal to 5%, the electrolytes in Embodiments 1 to 18 show excellent flame resistance. In addition, compared with the lithium secondary batteries in the comparative examples 1 to 6, the lithium secondary batteries in the embodiments 1 to 18 of the present application have better cycle performance, and the batteries show higher capacity retention rates after 500 cycles. Moreover, it can also be learned from the cycle curves in FIG. 1 and FIG. 2 that, the cycle performance of the lithium secondary battery in Embodiment 3 of the present application is significantly better than that of the lithium secondary battery in the comparative example 1. This is mainly caused by an effect of the electrolyte additive in this embodiment of the present application. A molecular structure of the electrolyte additive in the present application includes both a cyclotriphosphazene structure having a fire resistance function and a sulfonic group having a high-voltage film-forming function. Therefore, not only flame resistance of the electrolyte is improved, but also high-voltage cycle performance of the battery is improved such that safety of the lithium secondary battery may be further improved.

The electrolyte additive provided in the embodiments of the present application has the following two advantages: (1) The molecular structure includes the cyclotriphosphazene structure, and the structure has excellent flame resistance such that when the battery is in thermal runaway, burning of the electrolyte can be effectively suppressed and safety of the battery is improved. Moreover, the cyclotriphosphazene structure is well compatible with the positive and negative materials of the battery. (2) The molecular structure includes the sulfonic group, and the sulfonic group can form a dense and high-lithium-conductive coating layer on a surface of the positive electrode material of the battery. This can effectively suppress oxidation decomposition caused by direct contact between the electrolyte and the positive electrode material at a high voltage, and improve high-voltage cycle performance of the battery. Therefore, the additive is used to improve dual characteristics of flame resistance and high-voltage resistance of the electrolyte such that battery performance is significantly improved.

What is claimed is:

1. An electrolyte additive comprising:
   a six-membered ring structure comprising three nitrogen (N) atoms and three phosphorus (P) atoms arranged in a cyclotriphosphazene structure,
   wherein each of the three P atoms is bonded to two substituted groups such that the six-membered ring structure comprises six substituted groups represented as $R_1$, $R_2$, $R_3$, $R_4$, $R_5$, and $R_6$,
   wherein the $R_1$ comprises —O—S(=O)$_2$—R or —O—S(=O)$_2$—O—R,
   wherein an oxygen (O) atom of the $R_1$ and a P atom in the six-membered ring structure form a P—O bond,
   wherein R is any one of alkyl, haloalkyl, alkoxy, haloalkoxy, alkeny, haloalkenyl, alkenyloxy, haloalkenyloxy, aryl, haloaryl, aryloxy, haloaryloxy, substituted phosphate ester group, substituted imide group, or substituted sulfonyl imide group,
   wherein at least some of the $R_2$, the $R_3$, the $R_4$, the $R_5$, or the $R_6$ comprise a halogen atom directly bonded to the P atom, and
   wherein the electrolyte additive has a neutral charge.

2. The electrolyte additive of claim 1, wherein in the $R_1$, quantities of carbon atoms of the alkyl, the haloalkyl, the alkoxy, and the haloalkoxy range from one to twenty atoms, quantities of carbon atoms of the alkeny, the haloalkenyl, the alkenyloxy, and the haloalkenyloxy range from two to twenty atoms, quantities of carbon atoms of the aryl, the haloaryl, the aryloxy, and the haloaryloxy range from six to twenty atoms, and quantities of carbon atoms of substituted groups in the substituted phosphate ester group, the substituted imide group, and the substituted sulfonyl imide group range from one to twenty atoms.

3. A lithium secondary battery electrolyte comprising:
   a conductive lithium salt;
   a non-aqueous organic solvent; and
   an electrolyte additive,
   wherein a molecular structure of the electrolyte additive comprises a six-membered ring structure comprising three nitrogen (N) atoms and three phosphorus (P) atoms arranged in a cyclotriphosphazene structure,
   wherein each of the three P atoms is bonded to two substituted groups such that the six-membered ring structure comprises six substituted groups represented as $R_1$, $R_2$, $R_3$, $R_4$, $R_5$, and $R_6$,
   wherein the $R_1$ comprises —O—S(=O)$_2$—R or —O—S(=O)$_2$—O—R,
   wherein an oxygen (O) atom of the $R_1$ and a P atom in the six-membered ring structure form a P—O bond,
   wherein R is any one of alkyl, haloalkyl, alkoxy, haloalkoxy, alkeny, haloalkenyl, alkenyloxy, haloalkenyloxy, aryl, haloaryl, aryloxy, haloaryloxy, substituted phosphate ester group, or substituted imide group, substituted sulfonyl imide group, and
   wherein the electrolyte additive has a neutral charge.

4. The lithium secondary battery electrolyte of claim 3, wherein in the $R_1$, quantities of carbon atoms of the alkyl, the haloalkyl, the alkoxy, and the haloalkoxy range from one to twenty atoms, quantities of carbon atoms of the alkeny, the haloalkenyl, the alkenyloxy, and the haloalkenyloxy range from two to twenty atoms, quantities of carbon atoms of the aryl, the haloaryl, the aryloxy, and the haloaryloxy range from six to twenty atoms, and quantities of carbon atoms of substituted groups in the substituted phosphate ester group, the substituted imide group, and the substituted sulfonyl imide group range from one to twenty atoms.

5. The lithium secondary battery electrolyte of claim 3, wherein in the $R_1$, halogens in the haloalkyl, the haloalkoxy, the haloalkenyl, the haloalkenyloxy, the haloaryl, and the haloaryloxy comprise fluorine, chlorine, bromine, and iodine, and wherein the haloalkyl, the haloalkoxy, the haloalkenyl, the haloalkenyloxy, the haloaryl, and the haloaryloxy are perhalogenated groups or partially halogenated groups.

6. The lithium secondary battery electrolyte of claim 3, wherein R is methyl, ethyl, propyl, isopropyl, butyl, 1-butenyl, perfluorobutane, trifluoroethoxy, methylphenyl, vinylphenyl, fluorophenyl, dimethyl phosphate ester, di(trifluoroethyl) phosphate ester, acetylimino, or (trifluoromethylsulfonyl)imide.

7. The lithium secondary battery electrolyte of claim 3, wherein $R_1$ comprises the —O—S(=O)$_2$—O—R, and wherein one to three groups of the $R_2$, the $R_3$, the $R_4$, the $R_5$, or the $R_6$ comprise the —O—S(=O)$_2$—O—R.

8. The lithium secondary battery electrolyte of claim 3, wherein in the $R_1$, the $R_2$, the $R_3$, the $R_4$, the $R_5$, and the $R_6$, quantities of carbon atoms of the alkyl, the haloalkyl, the alkoxy, and the haloalkoxy range from one to twenty atoms, quantities of carbon atoms of the alkeny, the haloalkenyl, the alkenyloxy, and the haloalkenyloxy range from two to twenty atoms, quantities of carbon atoms of the aryl, the haloaryl, the aryloxy, and the haloaryloxy range from six to twenty atoms, and quantities of carbon atoms of substituted groups in the substituted phosphate ester group, the substituted imide group, and the substituted sulfonyl imide group range from one to twenty atoms.

9. The lithium secondary battery electrolyte of claim 3, wherein a mass percentage of the electrolyte additive in the electrolyte ranges from 0.1% to 20%.

10. The lithium secondary battery electrolyte of claim 3, wherein the conductive lithium salt comprises one or more of lithium perchlorate (LiClO$_4$), lithium tetrafluoroborate (LiBF$_4$), lithium hexafluorophosphate (LiPF$_6$), lithium hexafluoroarsenate (V) (LiAsF$_6$), lithium difluorophosphate (LiPF$_2$O$_2$), lithium triflate (LiCF$_3$SO$_3$), lithium 2-trifluoromethyl-4,5-dicyanoimidazolide (LiTDI), lithium bis(oxalato) borate (LiB(C$_2$O$_4$)$_2$), lithium difluoro(oxalato)borate (LiBF$_2$C$_2$O$_4$), lithium bis(trifluoromethanesulfonyl)imide (Li[(CF$_3$SO$_2$)$_2$N]), lithium bis(fluorosulfonyl)imide (Li[(FSO$_2$)$_2$N]), or Li[(C$_m$F$_{2m+1}$SO$_2$)(C$_n$F$_{2n+1}$SO$_2$)N], and wherein m and n are natural numbers.

11. The lithium secondary battery electrolyte of claim 3, wherein a molar concentration of the conductive lithium salt ranges from 0.1 moles per liter (mol/L) to 2.0 mol/L.

12. The lithium secondary battery electrolyte of claim 3, wherein the non-aqueous organic solvent comprises one or more of a carbonate solvent, an ether solvent, or a carboxylate solvent.

13. The lithium secondary battery electrolyte of claim 3, wherein the electrolyte additive comprises:

14. The lithium secondary battery electrolyte of claim 3, wherein the electrolyte additive comprises:

15. The lithium secondary battery electrolyte of claim 3, wherein the electrolyte additive comprises:

16. A lithium secondary battery electrolyte comprising:
a conductive lithium salt;
a non-aqueous organic solvent; and
an electrolyte additive, wherein a molecular structure of the electrolyte additive comprises a six-membered ring structure comprising three nitrogen (N) atoms and three phosphorus (P) atoms arranged in a cyclotriphosphazene structure,
wherein each of the three P atoms is bonded to two substituted groups such that the six-membered ring structure comprises six substituted groups represented as R$_1$, R$_2$, R$_3$, R$_4$, R$_5$, and R$_6$,
wherein the R$_1$ comprises —O—S(=O)$_2$—R or —O—S(=O)$_2$—O—R,
wherein an oxygen (O) atom of the R$_1$ and a P atom in the six-membered ring structure form a P—O bond,
wherein R is any one of alkyl, haloalkyl, alkoxy, haloalkoxy, alkeny, haloalkenyl, alkenyloxy, haloalkenyloxy, aryl, haloaryl, aryloxy, haloaryloxy, substituted phosphate ester group, substituted imide group, or substituted sulfonyl imide group,
wherein at least some of the R$_2$, the R$_3$, the R$_4$, the R$_5$, and the R$_6$ comprise a halogen atom directly bonded to the P atom, and
wherein the electrolyte additive does not have a positive or negative charge.

17. The lithium secondary battery electrolyte of claim 16, wherein the electrolyte additive does not contain any ionic bonds.

18. The lithium secondary battery electrolyte of claim 16, wherein the electrolyte additive comprises:

19. The lithium secondary battery electrolyte of claim 16, wherein the electrolyte additive comprises:

20. The lithium secondary battery electrolyte of claim 16, wherein the electrolyte additive comprises:

* * * * *